United States Patent
Nishimura et al.

(10) Patent No.: US 6,699,306 B2
(45) Date of Patent: Mar. 2, 2004

(54) CONTROL METHOD FOR COPPER DENSITY IN A SOLDER DIPPING BATH

(75) Inventors: Tetsuro Nishimura, Suita (JP); Masuo Koshi, Kadoma (JP); Kenichirou Todoroki, Kadoma (JP)

(73) Assignees: Nihon Superior Sha Co., Ltd. (JP); Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 10/030,882
(22) PCT Filed: Feb. 23, 2001
(86) PCT No.: PCT/JP01/01359
§ 371 (c)(1),
(2), (4) Date: Oct. 23, 2001
(87) PCT Pub. No.: WO01/62433
PCT Pub. Date: Aug. 30, 2001

(65) Prior Publication Data
US 2002/0134200 A1 Sep. 26, 2002

(30) Foreign Application Priority Data
Feb. 24, 2000 (JP) .......................... 2000-047437

(51) Int. Cl.[7] ................................. C22C 9/02
(52) U.S. Cl. .................. 75/386; 228/102; 228/103; 228/10; 228/11; 420/590
(58) Field of Search ............... 420/590; 228/33, 228/36, 37, 8–11, 256–262, 102, 103; 75/386

(56) References Cited

U.S. PATENT DOCUMENTS 4,634,044 A * 1/1987 Hargrove et al. ............ 228/183
5,393,489 A * 2/1995 Gonya et al. ................ 420/561

FOREIGN PATENT DOCUMENTS

JP      357011768    * 1/1982    ............ B23K/3/00

* cited by examiner

Primary Examiner—Melvyn Andrews
(74) Attorney, Agent, or Firm—Thompson Hine LLP

(57) ABSTRACT

This method controls a copper density in a dip solder bath holding a molten solder alloy containing at least copper as an essential composition thereof during a dip soldering step of one of a printed circuit board with a surfaced copper foil and a component part having a copper lead attached thereto. The method includes a step of introducing a replenished solder containing no copper at all or a copper content having a density lower than that of the molten solder in the bath prior to the supply of the replenished solder to the bath so that the copper density in the bath is controlled to a predetermined constant density or lower. The molten solder alloy in the bath contains tin, copper and nickel as the major compositions thereof, and the replenished solder contains nickel and balanced tin, for example. Alternatively, the molten solder alloy in the bath contains tin, copper, and silver as the major components thereof, and the replenished solder contains silver and balanced tin. The copper density of the molten solder in the bath is controlled to less than 0.85 weight % at a solder temperature of about 255° C.

21 Claims, 2 Drawing Sheets

Transition of Copper density with continuously adding Sn-approx. 0.5% Cu-approx. 0.05% Ni solder Transition of Copper density with continuously adding Sn-approx. 0.5% Cu-approx. 0.05% Ni solder Transition of Copper density with adding Sn-approx. 0.05% Ni alloy as a replenished solder

CONTROL METHOD FOR COPPER DENSITY IN A SOLDER DIPPING BATH

BACKGROUND OF THE INVENTION

1. Field of the Invention

The present invention relates to a composition of a lead-free solder, and more particularly, to a method for controlling the composition of a molten solder alloy in a solder bath to manufacture appropriate solder joints in a solder dipping operation.

2. Description of the Related Art

Solder typically acquires its wettability on metals at a relatively low temperature of 250° C. (degrees centigrade) or so. When a printed board or lead wires are made of copper, copper on the surface of the component dissolves into a solder bath in a soldering operation. This is called copper leaching. In lead-free solder, copper quickly dissolves during the wetting. The inventors of this invention have learned that the copper density rapidly rises in a solder bath. With the copper density rising, the melting point of the solder rises, surface tension and flowability change, leading to solder bridges, voids, incomplete solder connections, solder spikes, icicles, etc. The quality of the solder joint is thus substantially degraded. Further, in association with the copper density rise, the melting point rises. Once started, the rising of the copper density increases along with the rising of the melting point.

One of the inventors of this invention have developed a novel solder alloy containing nickel (International Publication WO99/48639), and have successfully improved flowability with nickel adding in the disclosed technique. In this case, the proper control of the content of copper is desirable.

Once the copper density rises, replacing the entire solder in a bath with new solder is an effective means to resolve this problem. The replacement of the solder, however, needs to be frequently performed, increasing costs, and requiring needless disposal of resources.

SUMMARY OF THE INVENTION

The present invention has been developed to resolve the above problem. It is an object of the present invention to provide a control method for controlling the copper density within a proper range without the need for the replacement of solder in a bath.

When widely used copper-plated printed boards and component parts having copper lead wires undergo a dip soldering operation, the copper density in the molten solder in a bath rises as a result of copper leaching. Learning that it is impossible to prevent this phenomenon, we have concluded that positively controlling the copper density by diluting the copper content is the best way possible.

Among solder alloys containing copper as the essential composition thereof, a Tin-Copper-Nickel based alloy, for example, is produced to improve solderability by adding a small amount of nickel to a Tin-Copper eutectic alloy, which are basic compositions for a lead-free solder. When dissolved, this solder exhibits an excellent flowability, and has high dip soldering performance in the assembly of a large quantity of electronic boards. This solder is almost free from bridges, voids, incomplete solder connections, solder spikes, icicles, etc. which are always problematic in a volume production. However, there is a substantial increase in the copper density of the molten solder in the bath depending on the throughput of the bath. The copper leaching develops a Tin-Copper intermetalic compound having a high melting point and unable to be dissolved at a predetermined operating temperature. We have observed that the alloy sticks on an object to be soldered, thereby degrading the solder quality. The amount of copper dissolved in tin varies with temperature. Since copper has a high melting point of 1,083° C., even a slight increase of copper results in a substantial rise in the melting point of the solder. We have studied ways of continuing the soldering operation without increasing the copper density in the solder, and developed the following method.

When a rise in the copper density of the molten solder in a bath containing tin, nickel and copper as the major compositions thereof, is observed, an alloy containing at least tin and nickel and further no copper at all or a copper content having a density lower than that of an initial molten solder held in the bath is replenished. When a lead-free solder of about 0.5% copper, and about 0.05% nickel with balanced tin as a reminder is introduced into a bath, an alloy containing at least about 0.05% nickel with balanced tin or an alloy containing at least about 0.05% nickel with balanced tin including less than 0.5% copper is replenished in order to keep solder conditions good with the replenishment of copper.

In another example, a lead-free solder of about 0.8% copper, about 3.5% silver, and about 0.05% nickel with balanced tin is introduced into a solder bath, an alloy containing at least about 3.5% silver, and about 0.05% nickel with balanced tin, or an alloy containing at least about 3.5% silver, and about 0.05% nickel with balanced tin including less than 0.8% copper is replenished in order to keep solder conditions good.

Since an alloy to be replenished (hereinafter "replenished alloy") has no copper content at all or a copper content having a density lower than that of the molten solder alloy prior to the alloy replenishment, the copper in the bath is diluted when the replenished alloy dissolves in the bath. Although the addition of copper in the replenished solder is not a requirement, when an increase rate in the copper density is slower than expected depending on the temperature conditions in the solder bath, it may be better to add a little amount of copper. The solder may be greatly consumed, for example, by a printed board having throughholes. In such a case, the replenishment of an alloy having no copper content at all is expected to excessively lower the copper content, and the replenishment of the alloy containing a slight amount of copper is preferable.

The lead-free solder in the bath includes tin, copper, and nickel. The present invention is not limited this. The present invention may be applied as long as the solder alloy in the bath includes at least copper. The present invention is also applied when the solder alloy in the bath includes elements for improving wettability or for anti-oxidation. To this end, silver, bismuth, indium, phosphorus, germanium, etc., may be included in the solder alloy. This means also falls within the scope of the present invention.

The amount of replenished solder is determined considering the consumption of molten solder in a bath, liquidus temperature, solder consumption per batch of printed boards, etc. In many cases, an increase in the copper density and the throughput of the printed boards are linearly correlated. The level of the molten solder in the bath is continuously monitored. The solder is then replenished when the amount of the solder drops below a predetermined level. The shapes of replenished solder bulk include but are not limited to a solder bar or a solder wire. Since the increase in the copper density and the throughput of the printed boards are linearly correlated as already discussed, a predetermined weight of solder may be replenished in response to a predetermined throughput of printed boards. Alternatively, solder replenishment may be performed for a predetermined period of time. These methods, optionally, may be used in combination.

In an optimum control to resolve various problems involved in the copper density rise, the copper density of the molten solder containing tin, copper and nickel as the major compositions thereof is preferably kept to less than 0.85 weight % with the molten solder at a temperature of about 255° C. A density target of 0.85 weight % is not a strict value but an approximate value, and has a margin depending on a shift in liquidus temperature. However, as solder connections become degraded over 0.90 weight %, the copper density target of 0.85 weight % may be observed, in this sense.

An apparatus, incorporating a printed board that is manufactured through the dip solder bath controlled in accordance with the above method, substantially prevents introduction of lead, which is considered as a poisonous metal. The apparatus does not contaminate working environments during manufacturing, and presents no serious environmental problems when it is disposed.

DESCRIPTION OF THE PREFERRED EMBODIMENTS

COMPARATIVE EXAMPLES

Figure 1:
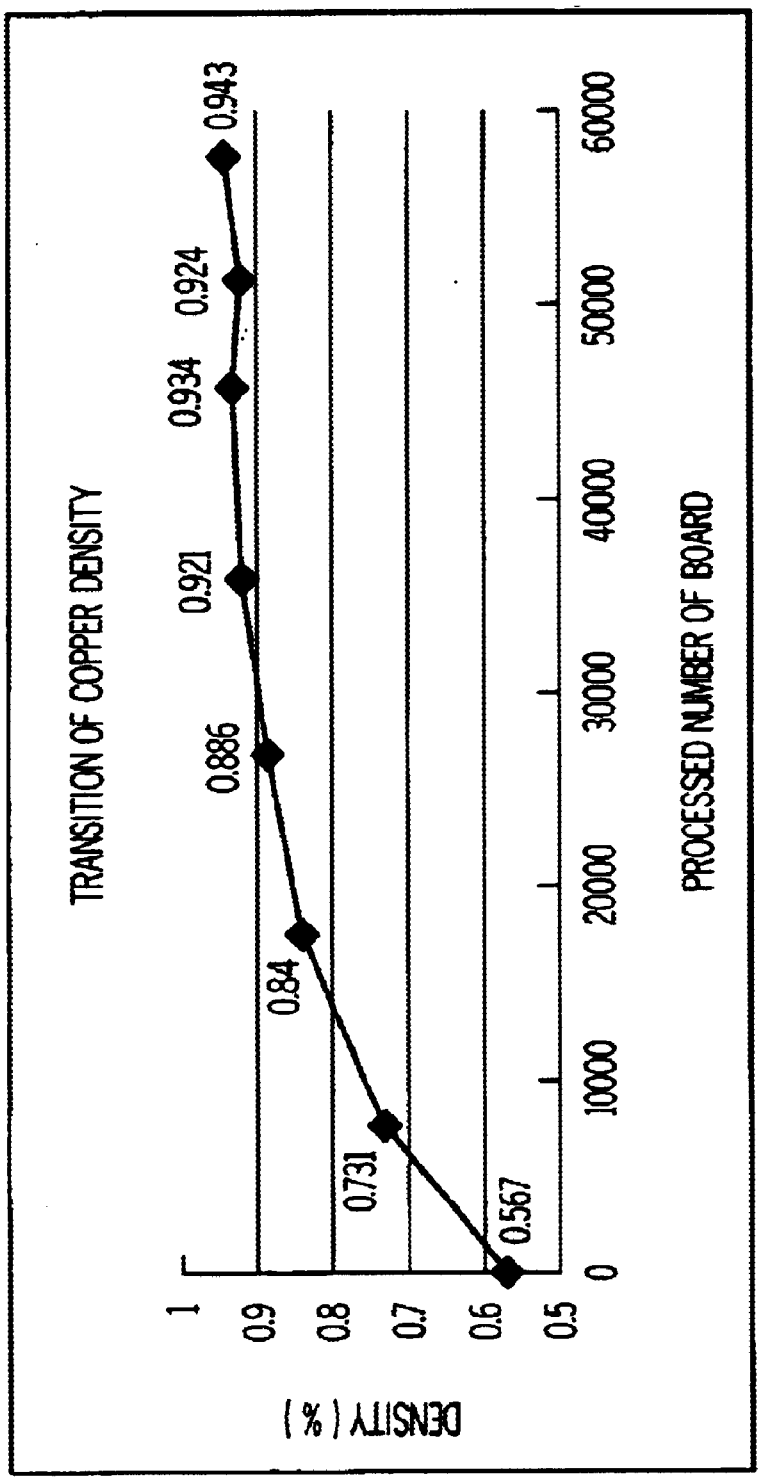
FIG. 1 is a graph plotting a change in a copper density in the conventional art.

A solder bath was filled with a solder containing about 0.5% copper, and about 0.05% nickel with the balanced tin. A great deal of printed boards was processed at a solder temperature of 255±2° C. When solder having the same composition as the initial solder was continuously replenished, the copper density in the bath increased to an undesirable level as shown in FIG. 1 in excess of an output of 20000 printed boards. As a result, the melting point of the solder in the bath rises, the solder in the bath changes in surface tension and flowability. Solderability of the solder became extremely poor with solder bridges, voids, incomplete solder joints, solder spikes, icicles, etc. Percentage hereinafter is expressed in weight percent throughout.

Example 1 of This Invention

Figure 2:
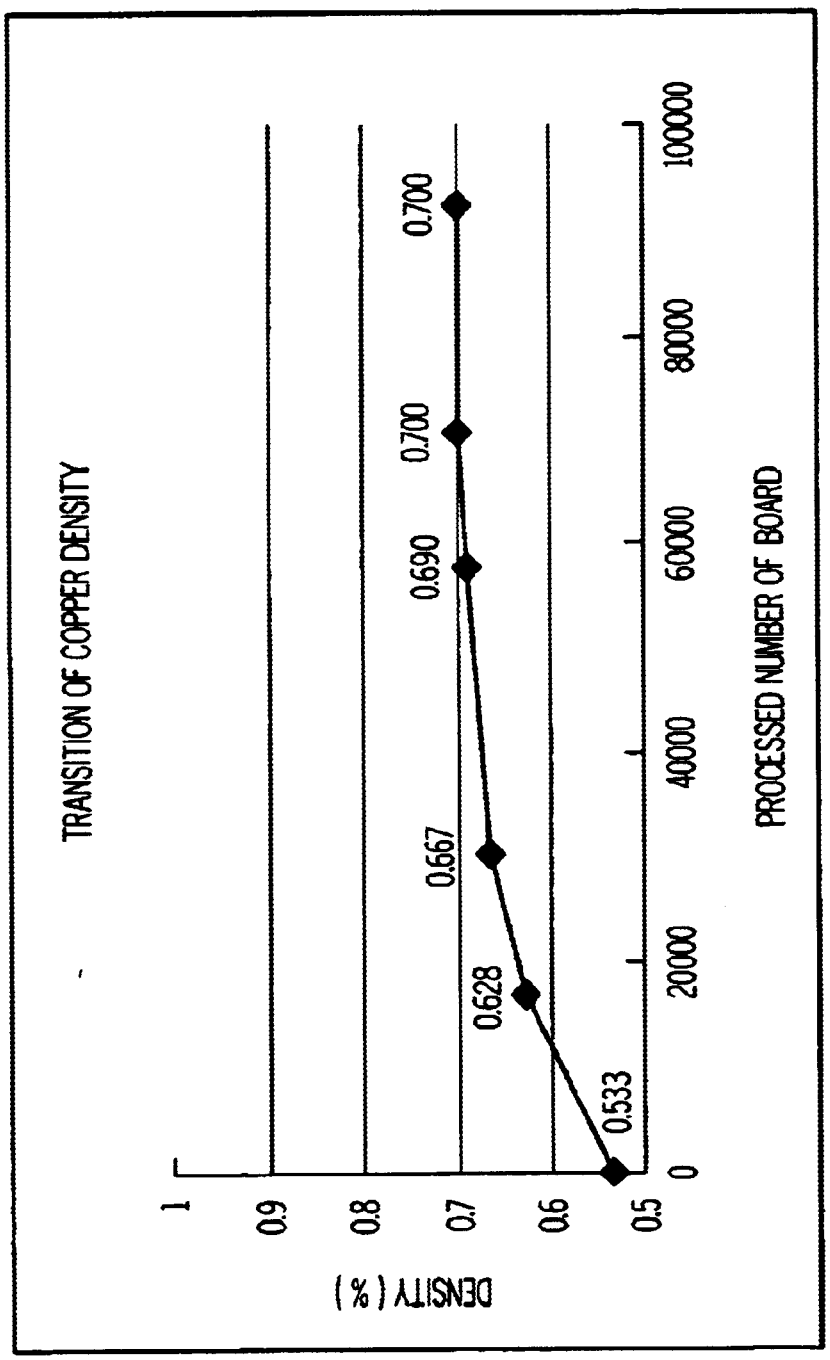
FIG. 2 is a graph plotting a change in a copper density when a solder containing Sn-0.05% Ni is replenished.

A solder bath was filled with a lead-free solder containing about 0.5% copper, and about 0.05% nickel and balanced tin. A great deal of printed boards was processed at a solder temperature of 255±2° C. under the same conditions as those in the comparative example. Solder having no copper content at all was then replenished. In this example, the replenished solder containing about 0.05% nickel with the remainder tin was continuously added. The copper density was stable at a level of 0.7% or so as shown in FIG. 2. No poor soldering performance was created.

Example 2 of This Invention

A solder bath was filled with an initial solder alloy containing about 0.6% copper, about 0.05% nickel with an antioxidant metal such as germanium, phosphorus or calcium added in a proper amount and with the remainder tin. A soldering operation was performed at a solder temperature of 255±2° C. under the same conditions as those in the comparative example. A solder alloy identical to the initial solder alloy in the bath, but without copper, was replenished. As a result, like in the example 2, the copper density reached about 0.7% and flattened off and was stabilized at that level.

Example 3 of This Invention

A solder bath was filled with a lead-free solder containing about 0.6% copper, and about 0.05% nickel with the remainder tin. A soldering operation was performed at a solder temperature of 255±2° C. under the same conditions as those in the preceding examples. A Tin-Nickel solder without copper but with an antioxidant metal such as germanium, phosphorus or calcium added in a proper amount was replenished. As a result, like in the above examples, the copper density reached about 0.7% and flattened off and is stabilized at that level.

The solder alloys used were a Tin-Copper-Nickel alloy. Positively controlled element was only copper, and there is no need for controlling other elements. This is true of the alloys which contain silver, bismuth, indium, phosphorus, germanium, etc. for improving wettability or for antioxidation.

The present invention positively controls, in a molten solder in a bath, copper which is an essentially required metal but is detrimental to solderability when the density thereof exceeds a threshold value. Even if a great deal of soldering operations is performed using the same solder bath, the quality of solder joints is kept excellent. An apparatus, incorporating a printed board that is manufactured through the solder dipping bath controlled in accordance with the above method, substantially reduce lead, and neither contaminate manufacturing environments, and operational environments, nor emit a large quantity of lead in disposal operations. The environmental contamination with volume production is thus substantially controlled.

What is claimed is:

1. A control method for copper density in a solder dipping bath comprising:

providing a solder dipping bath holding a molten solder alloy comprising copper and tin, dip soldering at least one copper-containing part selected from the group consisting of a printed circuit board having a copper foil attached thereon and a component part having a copper lead attached thereto, introducing a replenished solder without copper at all or a copper content having a density lower than that of the molten solder held in the bath prior to the supply of the replenished solder to the bath so that the copper density in the bath is controlled to a predetermined constant density or lower.

2. A control method for copper density in a solder dipping bath according to claim 1, wherein the molten solder alloy in the bath comprises tin, copper and nickel as the major compositions thereof, and wherein the replenished solder comprises tin and nickel as the major compositions thereof.

3. A control method for copper density in a solder dipping bath according to claim 1, wherein the molten solder alloy in the bath comprises tin, copper and nickel as the major compositions thereof, and the replenished solder comprises tin, copper and nickel as the major components thereof.

4. A control method for copper density in a solder dipping bath according to claim 1, wherein the molten solder alloy in the bath comprises tin, copper and silver as the major components thereof, and the replenished solder comprises tin and silver as the major compositions thereof.

5. A control method for copper density in a solder dipping bath according to claim 1, wherein the molten solder alloy in the bath comprises tin, copper and silver as the major compositions thereof, and the replenished solder comprises tin, copper and silver as the major compositions thereof.

6. A control method for copper density in a solder dipping bath according to claim 1, wherein the replenished solder is introduced when the level of the molten solder in the bath drops below a predetermined level.

7. A control method for copper density in a solder dipping bath according to claim 1, wherein the replenished solder is introduced to the molten solder bath each time a predetermined number of printed circuit boards is processed through the bath.

8. A control method for copper density in a solder dipping bath according to claim 1, wherein the copper density in the molten solder bath is controlled to less than 0.85 weight % with the molten solder alloy at a temperature of approximately 255° C.

9. An electrical and electronic apparatus incorporating a solder joint that is produced in the dip solder bath in accordance with a copper control method according to claim 1.

10. A method for controlling copper content in a solder dipping bath comprising: providing a molten solder bath holding a molten solder alloy comprising tin, copper and nickel as the major compositions thereof, adding to said bath a replenished solder comprising tin and nickel as the major compositions thereof.

11. A method for controlling copper content in a solder dipping bath comprising: providing a molten solder bath holding a molten solder alloy comprising tin, copper and silver as the major compositions thereof, adding to said bath a replenished solder comprising tin and silver as the major compositions thereof.

12. A control method for copper density in a solder dipping bath according to claim 2, wherein the replenished solder is introduced when the level of the molten solder in the bath drops below a predetermined level.

13. A control method for copper density in a solder dipping bath according to claim 3, wherein the replenished solder is introduced when the level of the molten solder in the bath drops below a predetermined level.

14. A control method for copper density in a solder dipping bath according to claim 4, wherein the replenished solder is introduced when the level of the molten solder in the bath drops below a predetermined level.

15. A control method for copper density in a solder dipping bath according to claim 5, wherein the replenished solder is introduced when the level of the molten solder in the bath drops below a predetermined level.

16. A control method for copper density in a solder dipping bath according to claim 2, wherein the replenished solder is introduced to the molten solder bath each time a predetermined number of printed circuit boards is processed through the bath.

17. A control method for copper density in a solder dipping bath according to claim 3, wherein the replenished solder is introduced to the molten solder bath each time a predetermined number of printed circuit boards is processed through the bath.

18. A control method for copper density in a solder dipping bath according to claim 4, wherein the replenished solder is introduced to the molten solder bath each time a predetermined number of printed circuit boards is processed through the bath.

19. A control method for copper density in a solder dipping bath according to claim 5, wherein the replenished solder is introduced to the molten solder bath each time a predetermined number of printed circuit boards is processed through the bath.

20. A control method for copper density in a solder dipping bath according to claim 2, wherein the copper density in the molten solder bath is controlled to less than 0.85 weight % with the molten solder alloy at a temperature of approximately 255° C.

21. A control method for copper density in a solder dipping bath according to claim 3, wherein the copper density in the molten solder bath is controlled to less than 0.85 weight % with the molten solder alloy at a temperature of approximately 255° C.

* * * * *